No. 780,415. PATENTED JAN. 17, 1905.
I. C. EAVENSON.
APPARATUS FOR EXPRESSING JUICE FROM MEAT.
APPLICATION FILED APR. 21, 1904.

3 SHEETS—SHEET 1.

Witnesses:

Inventor:
Ida C. Eavenson,
by her Attorneys

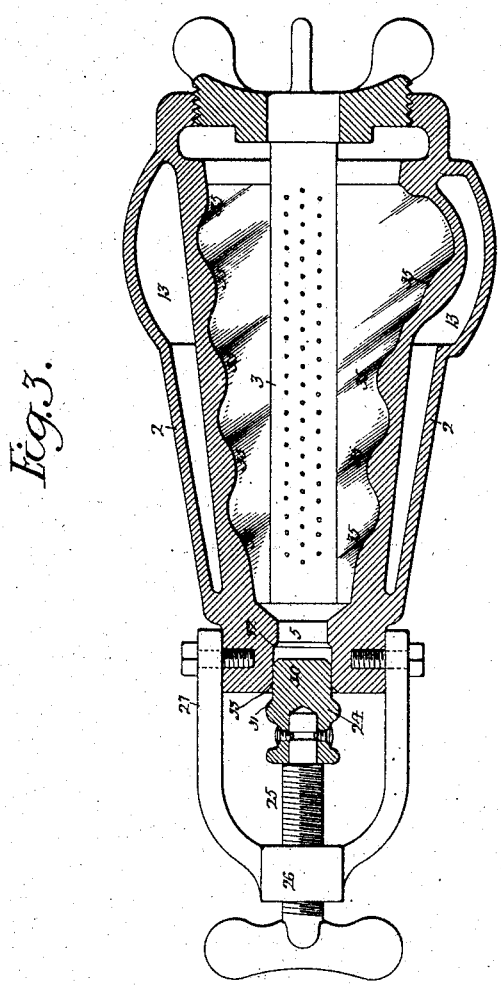

No. 780,415. Patented January 17, 1905.

UNITED STATES PATENT OFFICE.

IDA C. EAVENSON, OF PHILADELPHIA, PENNSYLVANIA.

APPARATUS FOR EXPRESSING JUICE FROM MEAT.

SPECIFICATION forming part of Letters Patent No. 780,415, dated January 17, 1905.

Application filed April 21, 1904. Serial No. 204,257.

*To all whom it may concern:*

Be it known that I, IDA C. EAVENSON, a citizen of the United States, residing in Philadelphia, Pennsylvania, have invented certain Improvements in Apparatus for Expressing Juice from Meat, of which the following is a specification.

The object of my invention is to so construct a device for pressing juice from meat that the extractor can be conveniently and economically heated by gas and the extraction of the juice can thereby be effected by the combined action of heat and pressure in an apparatus designed for domestic use.

Figure 1:
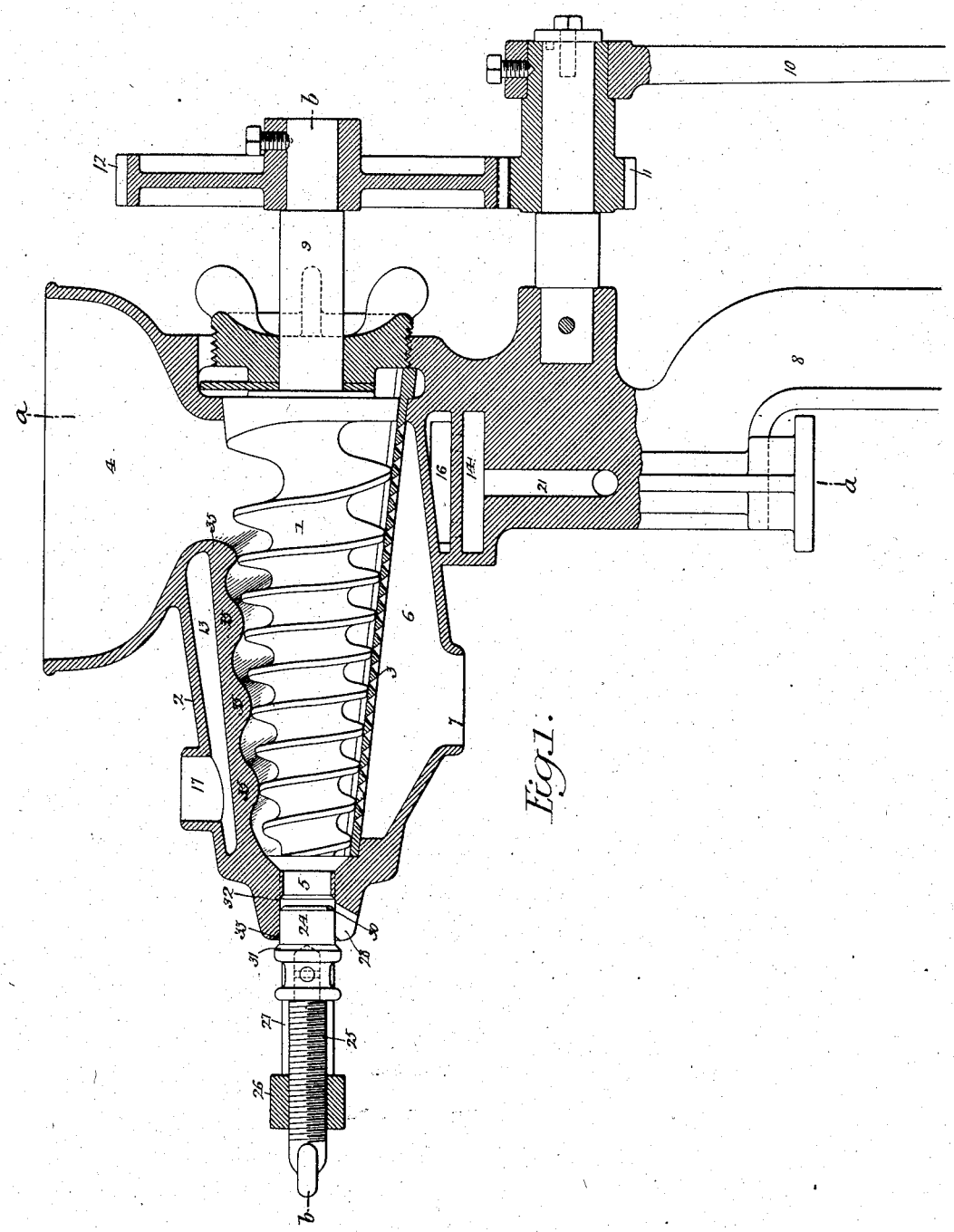
Figure 2:
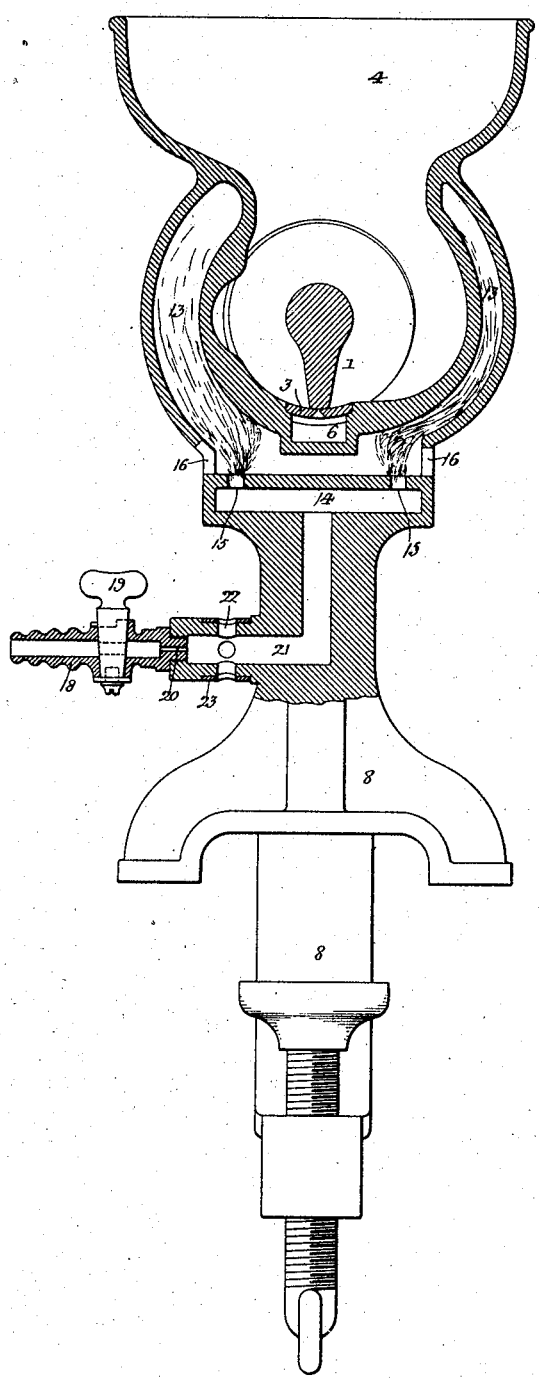

In the accompanying drawings, Figure 1 is a longitudinal section, partly in elevation, of a meat-juice extractor constructed in accordance with my invention. Fig. 2 is a view, partly in elevation and partly in transverse section, on the line *a a*, Fig. 1; and Fig. 3 is a view, partly in elevation and partly in section, on the line *b b*, Fig. 1.

I have shown my invention as applied to that class of meat-juice extractors in which a tapering forcing-screw 1 operates within a corresponding tapering casing 2, having in the bottom a perforated strainer-plate 3, at the top and near one end a feed-hopper 4, and at the opposite end a discharge-orifice 5, through which is delivered the pulp from which the juice has been pressed, the juice being collected in a chamber 6 beneath the strainer-plate 3 and being discharged therefrom through a spout 7, the whole structure being mounted upon a clamping-bracket 8 and the screw-shaft 9 being rotated by means of a crank arm or handle 10, which operates, through the medium of a spur-pinion 11 and spur-gear 12, so as to increase the amount of power applied to the screw-shaft.

So far as described the device is not novel; and my invention consists in combining with it means for heating the casing 2, for enhancing the squeezing or pressing effect of the screw 1, and for controlling the discharge-orifice 5.

For the purpose of heating the casing I employ a gas-flame, the casing 2 being hollow or double-walled throughout the greater portion of its extent, so as to inclose a chamber 13, in which the heated products of combustion can circulate, so as to impart any desired degree of heat to the extracting-chamber, and thereby raise the temperature of the meat within said chamber to a degree best calculated to insure the extraction of the maximum amount of juice therefrom when it is subjected to the pressure of the forcing-screw 1.

The gas and air intended to form the Bunsen flame relied upon for heating purposes are mixed in a chamber 14 below the chamber 13, the mixture of air and gas escaping through orifices 15 in the partition between the two chambers and air to support combustion entering the chamber 13 at points adjacent to these orifices through openings or slots 16 in the outer wall of the hollow casing, as shown in Fig. 2.

The products of combustion circulate around the sides and over the top of the extracting-chamber, the waste products of combustion escaping from an outlet 17, which may, if desired, connect with a suitable escape flue or chimney.

A nipple 18, connected to a suitable source of gas-supply and provided with a regulating-valve 19, discharges gas through a jet 20 into an angular passage 21, communicating with the chamber 14, and air for admixture with the gas is admitted to the passage 21 through openings 22, the area of which can be regulated by adjustment of the ring-valve or damper 23, as shown in Fig. 2, whereby the relative volumes of air and gas can be regulated so as to secure any desired heating result.

The area of the discharge-orifice 5 is governed by adjustment of a plug 24, which is swiveled to a screw-stem 25, the latter engaging a nut 26, which forms part of a yoke 27, pivotally mounted upon the casing 2, the discharge end of said casing having a downwardly-extending slot 28, through which the discharged pulp can pass into a receptacle suitably located. When it is desired to provide free outlet from the pressure-chamber of the device for cleaning or other purposes, the plug 24 can be fully retracted by manipulation of the screw-stem 25, and the yoke 27 can then be swung upward or downward, so as to carry the plug out of line with the orifice 5 and provide a straightway passage at the end of the casing.

The plug 24 has two valve-faces 30 and 31, and the casing 2 has inner and outer valve-seats 32 and 33, which bear such relation to the valve-faces 30 and 31 of the plug that the outer valve-face 31 will contact with the outer seat 33 before the inner valve-face 30 contacts with the inner seat 32 and will therefore act as a stop to prevent the entire closing of the outlet 5, thus preventing injury to the machine which might be caused by continued rotation of the forcing-screw 1 after the discharge of pulp from the machine had been cut off.

The interior of the casing 2 presents a series of spiral ribs 35, whose pitch is the reverse of that of the threads of the forcing-screw 1 and is steeper than the same, these ribs having blunt or rounded faces, so that they will coöperate with the threads of the forcing-screw to form successive points of resistance to the forward movement of the meat in the casing, and thus provide successive compressions and expansions of the meat in its passage through the casing instead of a single progressive compression.

It will be noted that my juice-extractor is continuous in its operation—that is to say, the pulp from which the juice has been extracted is being continually delivered from the orifice 5 and fresh meat can be continually fed to the machine through the hopper 4—my invention in this respect being essentially different from machines of the plunger type, which are essentially intermittent in their operation.

Having thus described my invention, I claim and desire to secure by Letters Patent—

1. A meat-juice extractor having, in combination, a forcing-screw, a casing receiving the same and having a strainer-plate, a discharge-orifice and a feed-hopper, said casing being double-walled so as to provide a heating-chamber partially enveloping the extracting-chamber, and a gas-burner supplying products of combustion to said heating-chamber, substantially as specified.

2. A meat-juice extractor in which are combined a forcing-screw, a casing receiving the same and having a strainer-plate, a discharge-orifice and a feed-hopper, said casing being double-walled so as to provide a heating-chamber which partially envelops the extracting-chamber, and a gas and air mixing chamber communicating with said heating-chamber, the outer wall of the heating-chamber having openings for the inflow of air to support combustion, substantially as specified.

3. A meat-juice extractor having, in combination, a forcing-screw, a casing receiving the same and having a perforated strainer-plate, a discharge-orifice and a feed-hopper, said casing being double-walled so as to provide a heating-chamber which partially envelops the extracting-chamber, a clamping-bracket for said casing, and gas and air mixing passages in said bracket, substantially as specified.

4. A meat-juice extractor comprising, in combination, a forcing-screw having a sharp-edged spiral, and a casing receiving the same and having a perforated strainer-plate, a discharge-orifice, a feed-hopper, and internal ribs presenting a blunt or rounded face opposed to the sharp-edged spiral of the screw, substantially as specified.

5. A meat-juice extractor having, in combination, a forcing-screw and a casing receiving the same and having a perforated strainer-plate, a discharge-orifice, a feed-hopper, and internal spiral ribs whose pitch is the reverse of, and is steeper than, that of the threads of the forcing-screw, substantially as specified.

6. A juice-extractor having, in combination, a forcing-screw and a casing receiving the same and having a perforated strainer-plate, a feed-hopper, a discharge-orifice, a swinging yoke pivoted to the casing, and a regulating-plug for said discharge-orifice adjustable on said swinging yoke, substantially as specified.

7. A juice-extractor having, in combination, a forcing-screw and a casing receiving the same and having a perforated strainer-plate, a feed-hopper and a discharge-orifice with regulating-plug having a stop for preventing the same from closing said discharge-orifice, substantially as specified.

In testimony whereof I have signed my name to this specification in the presence of two subscribing witnesses.

IDA C. EAVENSON.

Witnesses:
 WALTER CHISM,
 JOS. H. KLEIN.